(12) United States Patent
Gilmore et al.

(10) Patent No.: US 10,754,508 B2
(45) Date of Patent: Aug. 25, 2020

(54) TABLE OF CONTENTS IN A PRESENTATION PROGRAM

(71) Applicant: Microsoft Technology Licensing, LLC, Redmond, WA (US)

(72) Inventors: Michael Jay Gilmore, Bothell, WA (US); Kerry Young, San Jose, CA (US); Lei Shi, Cupertino, CA (US); Charles Cummins, Seattle, WA (US); Lauren Michelle Janas, Palo Alto, CA (US); Derek Martin Johnson, Mountain View, CA (US); Paul Scuderi, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 79 days.

(21) Appl. No.: 15/332,196

(22) Filed: Oct. 24, 2016

(65) Prior Publication Data
US 2017/0220217 A1    Aug. 3, 2017

Related U.S. Application Data

(60) Provisional application No. 62/288,148, filed on Jan. 28, 2016.

(51) Int. Cl.
*G06F 3/0483* (2013.01)
*G06F 16/40* (2019.01)
(Continued)

(52) U.S. Cl.
CPC .......... *G06F 3/0483* (2013.01); *G06F 3/0482* (2013.01); *G06F 3/04845* (2013.01);
(Continued)

(58) Field of Classification Search
CPC .. G06F 3/0482; G06F 3/0483; G06F 3/04845; G06F 9/451; G06F 9/4443; G06F 16/40; G06F 16/4393
(Continued)

(56) References Cited

U.S. PATENT DOCUMENTS

| | | |
|---|---|---|
| 5,708,825 A | 1/1998 | Sotomayor |
| 6,834,371 B1 | 12/2004 | Jensen et al. |

(Continued)

OTHER PUBLICATIONS

User Guide to Non-Linear Presentations. Blog [online]. iSpring, Nov. 12, 2015 [retrieved on Dec. 3, 2019]. Retrieved from the Internet: https://web.archive.org/web/20151118004731/https:/www.ispringsolutions.com/blog/user-guide-for-non-linear-presentations (Year: 2015).*

(Continued)

*Primary Examiner* — David S Posigian

(57) ABSTRACT

In a non-limiting example of the present disclosure, an exemplary table of contents slide may be displayed for a slide deck of a presentation program. The table of contents slide may comprise one or more sections of grouped slides for the slide deck. A selection of a section link may be received. The section link links the table of contents slide to a section of grouped slides. An exemplary presentation program may navigate the slide deck to a first slide of the section based on the received selection. When the navigation of the section is completed, the presentation program returns the slide deck to one of: the table of contents slide and the first slide of the section. Other examples described relate to creation and rendering of an exemplary table of contents slide and/or section links within an exemplary table of contents slide of a presentation program.

20 Claims, 12 Drawing Sheets

(51) Int. Cl.
G06F 16/438 (2019.01)
G06F 9/451 (2018.01)
G06F 3/0482 (2013.01)
G06F 16/25 (2019.01)
G06F 3/0484 (2013.01)

(52) U.S. Cl.
CPC ............ G06F 9/451 (2018.02); G06F 16/252 (2019.01); G06F 16/40 (2019.01); G06F 16/4393 (2019.01)

(58) Field of Classification Search
USPC .................................................. 715/730–732
See application file for complete search history.

(56) References Cited

U.S. PATENT DOCUMENTS

| | | | |
|---|---|---|---|
| 7,372,991 B2 | 5/2008 | Chen et al. | |
| 8,108,777 B2 | 1/2012 | Penner et al. | |
| 8,892,501 B2 | 11/2014 | Bruland et al. | |
| 8,977,978 B2 | 3/2015 | Cho et al. | |
| 2002/0109712 A1* | 8/2002 | Yacovone | G06F 16/41 715/732 |
| 2003/0222890 A1* | 12/2003 | Salesin | G06F 17/30017 345/629 |
| 2005/0138570 A1* | 6/2005 | Good | G06F 3/0481 715/789 |
| 2005/0154995 A1* | 7/2005 | Miller | G06F 40/137 715/772 |
| 2005/0166149 A1* | 7/2005 | Frigon | G06F 17/30274 715/712 |
| 2009/0265632 A1* | 10/2009 | Russ | G06F 17/30056 715/716 |
| 2010/0031152 A1* | 2/2010 | Villaron | G06F 3/0481 715/731 |
| 2010/0037140 A1 | 2/2010 | Penner et al. | |
| 2010/0122171 A1* | 5/2010 | Bauchot | G06F 17/30056 715/732 |
| 2011/0112832 A1 | 5/2011 | Prorock et al. | |
| 2013/0055077 A1* | 2/2013 | Hagel-Sorensen | G06F 17/212 715/273 |
| 2013/0132895 A1* | 5/2013 | Nemeth | G06F 9/4443 715/799 |
| 2014/0101605 A1* | 4/2014 | Udvardy | G06F 3/0485 715/800 |
| 2014/0359525 A1* | 12/2014 | Weiner | G06F 3/04815 715/782 |
| 2014/0365897 A1* | 12/2014 | Maloney | G06F 3/0481 715/731 |
| 2015/0007005 A1* | 1/2015 | Edge | G06F 17/24 715/205 |
| 2015/0134722 A1 | 5/2015 | Marshall et al. | |

OTHER PUBLICATIONS

"International Search Report and Written Opinion Issued in PCT Application No. PCT/US2017/013631", dated Apr. 18, 2017, 15 Pages.

"User Guide to Non-Linear Presentations", Published on: Nov. 12, 2015 Available at: http://www.ispringsolutions.com/blog/user-guide-for-non-linear-presentations/.

Luchini, et al., "Creating and Managing Effective PowerPoint Presentations for International Audiences", in MasterView International, Issue 11, Apr. 15, 2002, 15 pages.

"How to put section links in PowerPoint", Published on: Aug. 26, 2010 Available at: http://mjmobbs.com/?p=352.

Lee, Kevin, "How to Create a Table of Contents for a PowerPoint Presentation", Published on: Dec. 5, 2014 Available at: http://www.ehow.com/how_5641489_create-powerpoint-table-contents.html.

"Create a PowerPoint table of contents automatically", Published on: Apr. 2014 Available at https://www.maps4office.com/create-powerpoint-table-contents-automatically/.

Kunesh, Andrew, "Beyond PowerPoint & Keynote: The 20 Best Presentation Apps", Published on: Oct. 28, 2014 Available at: https://zapier.com/blog/best-powerpoint-alternatives/.

"Organize your slides into sections", Retrieved on: Dec. 16, 2015 Available at: https://support.office.com/en-us/article/Organize-your-slides-into-sections-DE4BF162-E9CC-4F58-B64A-7AB09443B9F8.

* cited by examiner

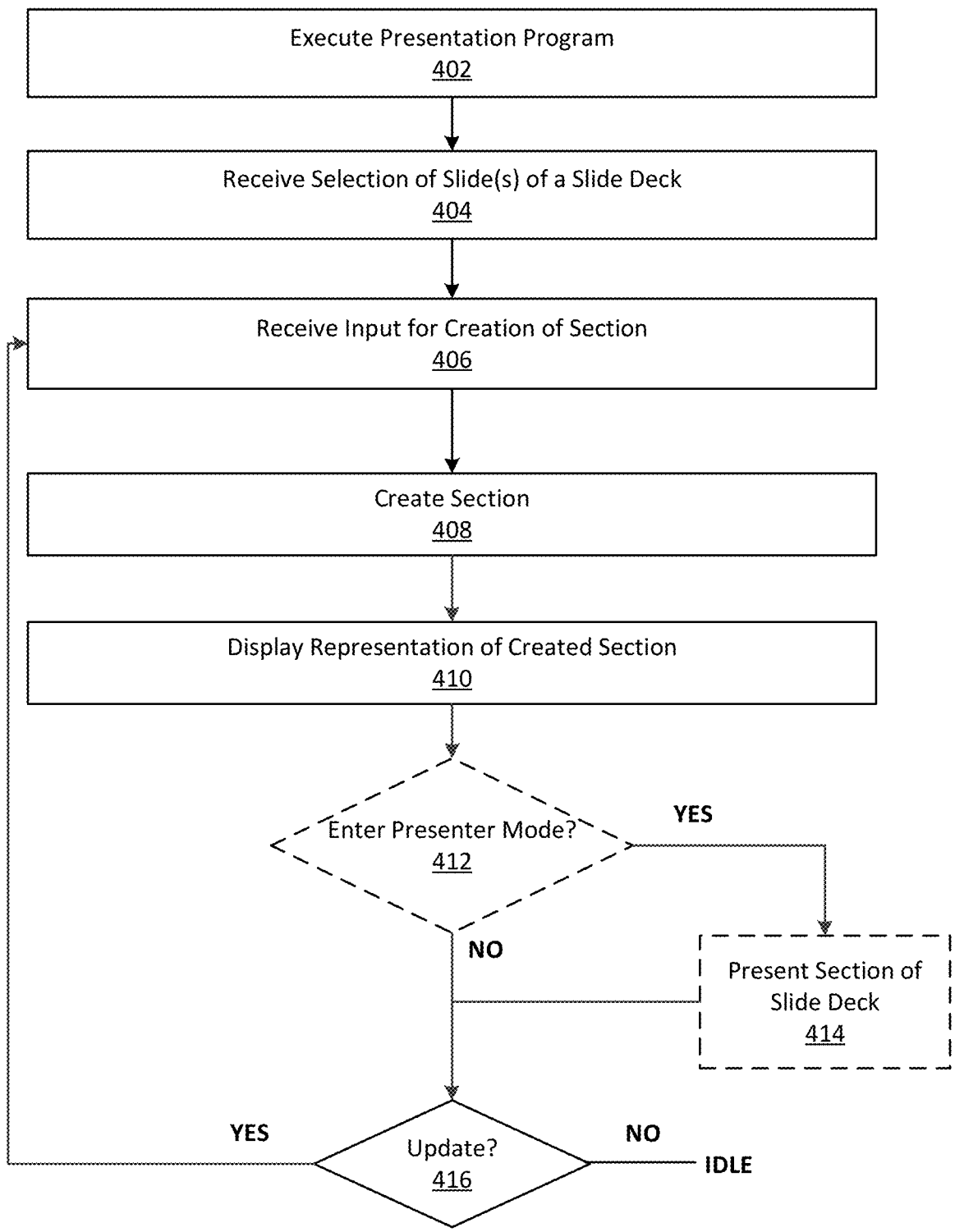

420

430

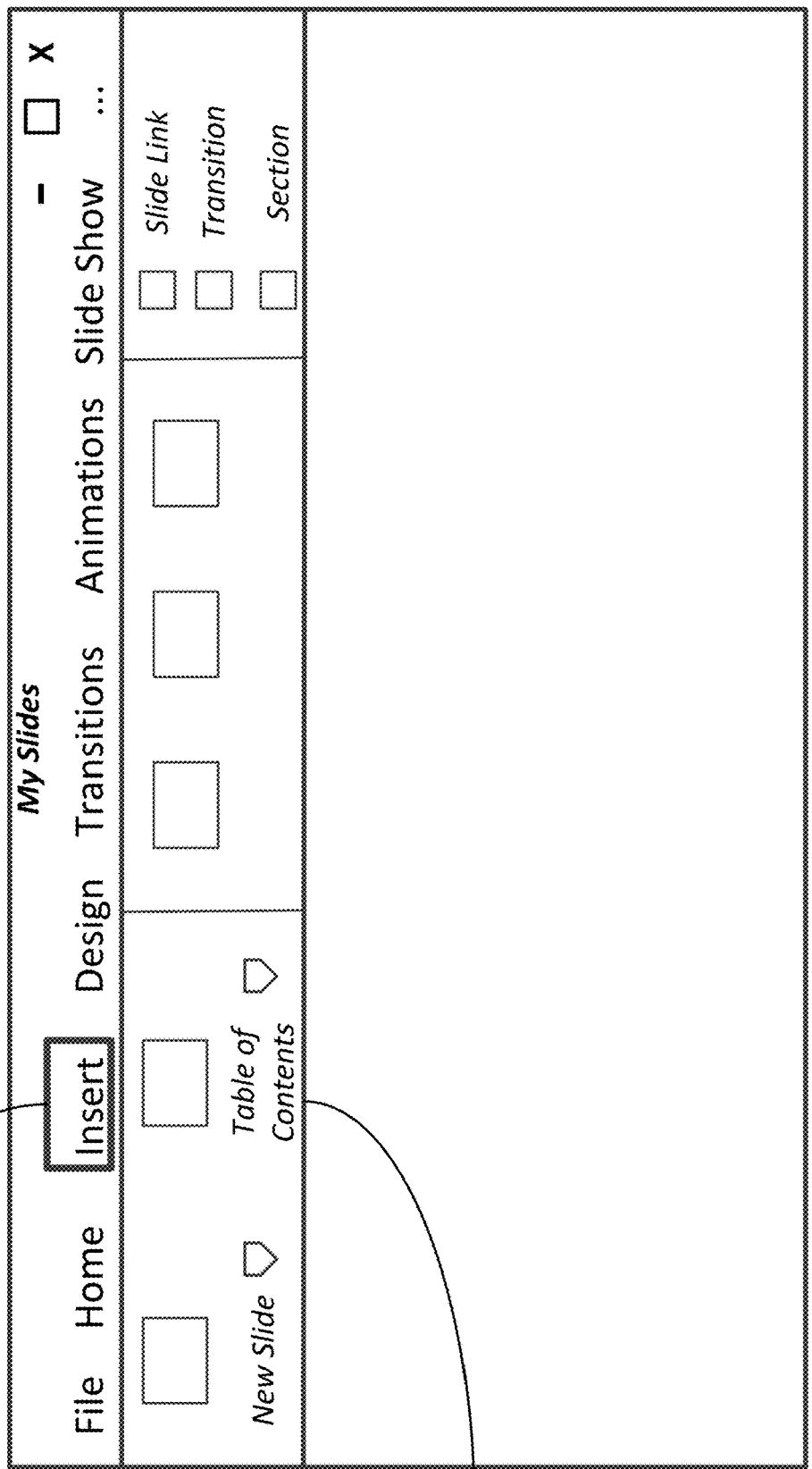

510

530

TABLE OF CONTENTS

◇ <u>Section 1</u> ← 532

1

2

<u>Section 2: Table of Contents Feature</u> — 534

3 Table of Contents Feature Improves Productivity!

4

TABLE OF CONTENTS IN A PRESENTATION PROGRAM

CROSS-REFERENCE TO RELATED APPLICATION(S)

This application is a Non-Provisional Patent Application of, and claims priority to, U.S. Provisional Patent Application No. 62/288,148, filed Jan. 28, 2016, entitled "TABLE OF CONTENTS IN A PRESENTATION PROGRAM," which application is incorporated herein by reference in its entirety.

TECHNICAL BACKGROUND

Presentation programs are software applications that allow end-users to create and/or view slide-based presentations. PowerPoint® from Microsoft®, Google® Slides, and Keynote® from Apple® are several examples of presentation programs that follow the slideshow model for presentations. Users utilize presentation programs to create slide-based presentations. However, it is difficult for users to organize series of slides and/or content for slide-based presentations. Presently, users have to manually organize slides in an order that they desire. Further, during presentation of a slide show, navigation between slides is restricted by an order in which the slides are organized.

As such, examples of the present application are directed to the general technical environment related to improving organization and navigation of presentation programs, among other examples.

SUMMARY

Technology is disclosed herein that enhances processing of a device executing a presentation program, which also enhances a user experience when interacting with the presentation program. In an implementation, a presentation program includes an exemplary table of contents feature that allows a user to create sections in a presentation of slides. The lead slide in each section can be designated and all of the designated lead slides displayed in a table of contents slide. When in presentation mode, a slide show returns automatically to the table of contents slide at the end of each section. Other examples described herein relate to creation and rendering of an exemplary table of contents slide and/or section links within an exemplary table of contents slide, for example, in a presentation program.

Other non-limiting examples of the present disclosure describe improved navigational functionality during a presentation in a presentation program. An exemplary table of contents slide may be displayed for a slide deck of a presentation program. The table of contents slide may comprise one or more sections of grouped slides for the slide deck. A selection of a section link may be received. The section link links the table of contents slide to a section of grouped slides. An exemplary presentation program may navigate the slide deck to a first slide of the section based on the received selection. Additional slides of the section may be navigated. When the navigation of the section is completed, the presentation program returns the slide deck to one of the table of contents slide and the first slide of the section. Other examples described relate to creation and rendering of an exemplary table of contents slide and/or section links within an exemplary table of contents slide of a presentation program.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4A is an exemplary method related to creation of an exemplary section of slides, with which aspects of the present disclosure may be practiced.

FIGS. 5A-5E provide exemplary user interface views for an exemplary presentation program, with which aspects of the present disclosure may be practiced.

DETAILED DESCRIPTION

Figure 1:
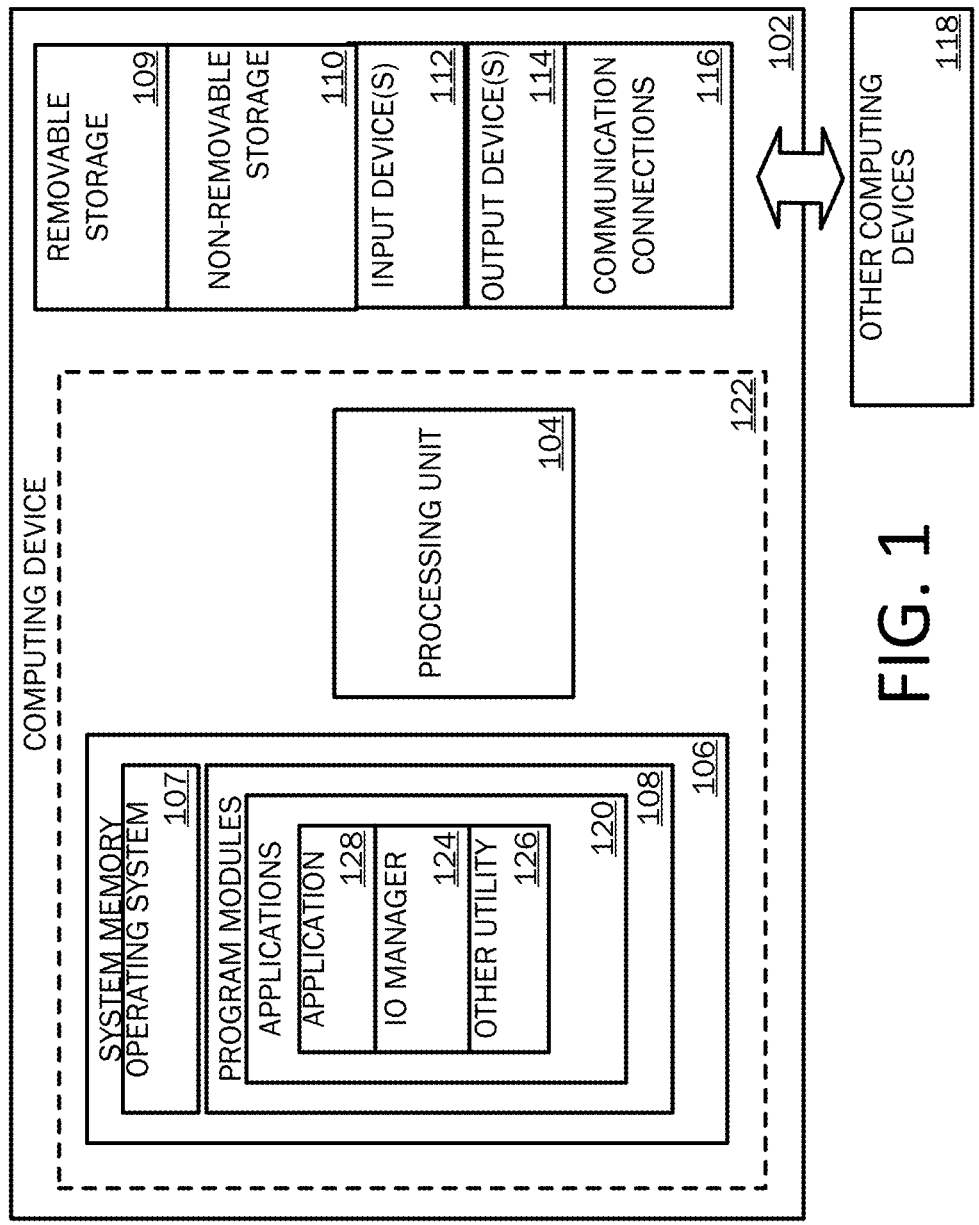
FIG. 1 is a block diagram illustrating an example of a computing device with which aspects of the present disclosure may be practiced.

Technology is disclosed herein that enhances execution of an exemplary presentation program, for example, when creating a slide deck for presentation and/or viewing a created slide deck, among other examples. An exemplary presentation program may be configured to provide features for creation and management of a table of contents within a presentation program. The table of contents may be utilized for organization of content of a slide deck into sections that can be navigated during presentation of the slide deck. As an example, a presentation program may be configured to enable a user to create a table of contents slide. A table of contents slide is a master slide that is usable to navigate to sections in an exemplary slide deck, which may be presented in a presentation view of the presentation program (or another type of productivity application). A slide deck is a group of slides that is used for a slide show presentation.

An exemplary table of contents slide may comprise one or more section links, that can be used to provide direct access from the table of contents slide to a section of slides (e.g. one or more grouped slides). A section link can be created for a section (e.g. group of one or more slides). The section link may be inserted into an exemplary table of contents slide to provide a direct link to the section. The section link may be editable, where a user can manipulate content associated with the section link as well as the placement, scale and orientation of the section link, among other features. In one example, a section link may be a slide preview of a first slide of section (e.g. parent slide of the section that may comprise additional child slides). A slide preview may be a pictorial representation of a slide but may comprise additional types of content including but not limited to rich text format, audio content, video content, hyperlinks, etc. The slide preview may incorporate content from one or more slides of the section either in aggregation or as individual representations of the slides of a section.

Table of contents features described herein can assist users with organizing content of a slide deck. Table of contents features are also use to enhance user interaction with an exemplary presentation program, for example, by improving a viewing experience for a user when viewing a slide deck in a presentation view of the presentation program. An exemplary presentation program may be configured to provide user interface features (and assistance) for creating a table of contents slide for a slide deck. The table of contents slide can be utilized to create a custom viewing experience for a user that immerses the user into a selected section. For instance, the presentation program may be configured to execute a contextual zoom transition between a table of contents slide and slides of selected sections. However, contextual zoom transitions can be applied for slide transitions between any type of slide of a slide deck. A contextual zoom provides a view of content for the slide that is next to be viewed in a manner that relates to the slide that is currently being viewed. In one example, the presentation program may be configured to apply a contextual zoom transition that appears to seamlessly move to another slide so a user does not feel like the presentation program is moving to another slide. For instance, a contextual zoom transition of this nature may be programmed to occur when a user is transitioning between slides of a section. In that example, a zoom transition may adopt a background of a parent slide of a section and maintain that background as navigation proceeds through slides of the section.

In another example, a contextual zoom transition may be dynamic to account for manipulation of an exemplary section link. For instance, a zoom-in transition may be generated for a transition between the table of contents slide and a first slide of the section. The zoom-in transition may account for features of the section link including: a placement, a scale and an orientation of the section link in the table of contents slide. As an example, a section link may be located in an upper left corner of the table of contents slide, scaled to be larger than other content of the slide and oriented at an angle where the text of the section link is rotated to be in a vertical alignment. In that example, a zoom-in transition may initiate a zoom from the perspective of the selected section link where the transition: is initiated from the left side of the table of contents slide, enlarges the text of the section link and rotates a canvas displaying the slide from an orientation of the text of the section link to an orientation that matches the content of the first slide of the section. This is just one of many possible examples that illustrates how a zoom transition for a section link is more dynamic than that of a standard zoom transition between slides. Standard zoom transitions typically only allow zooming from a center of a slide inward, where timing is the only adjustable parameter for standard transitions. Improved zoom transition functionality can be applied to any slide transition scenario including zoom-out transitions (e.g. from a section to a table of contents slide) and/or transitions between slides of a section, among other examples.

Upon completion of the section, a presentation program can be configured to return viewing back to the table of contents slide or alternatively a parent slide of a section. In one example, completion of a last slide of a section may trigger an automatic return back to an exemplary table of contents slide. In an alternative example, completion of a section may trigger an automatic return back to a first slide (e.g. parent slide) of a section. In further examples, a presentation program can be configured to create a customized return where a user may designate a slide to return to after completion of a section. Such examples provide enhanced navigational control when viewing a slide deck (e.g. in a presenter view) as well as improving an overall user experience when using a presentation program, among other examples. A contextual zoom-out transition may be executed to navigate from a last slide of a section back to the table of contents slide (or other designated slide). In one example, an exemplary contextual zoom-out transition may account for the features of the section link, which is utilized to access the section of slides of a slide deck. A contextual zoom-out transition may account for features of the section link including: a placement, a scale and an orientation of the section link in the table of contents slide. For instance, in the example above where the section link may be located in an upper left corner of the table of contents slide, scaled and oriented (as described in the zoom-in transition example), a zoom-out transition may be the reverse of that described above in the zoom-in transition to return back to the table of contents slide from another slide (e.g. linked by the section link).

Accordingly, the present disclosure provides a plurality of technical advantages including but not limited to: improved functionality for a presentation program including user interface elements for creation and management of an exemplary table of contents slide, improved organization of content of a slide deck including an ability to group slides and create section links, more efficient operation of processing devices (e.g., saving computing cycles/computing resources) when creating a table of contents slide and/or viewing a slide deck and improved user interaction with an exemplary presentation program including improved navigational control when viewing a slide deck in a presenter view, among other examples.

Figure 2A:
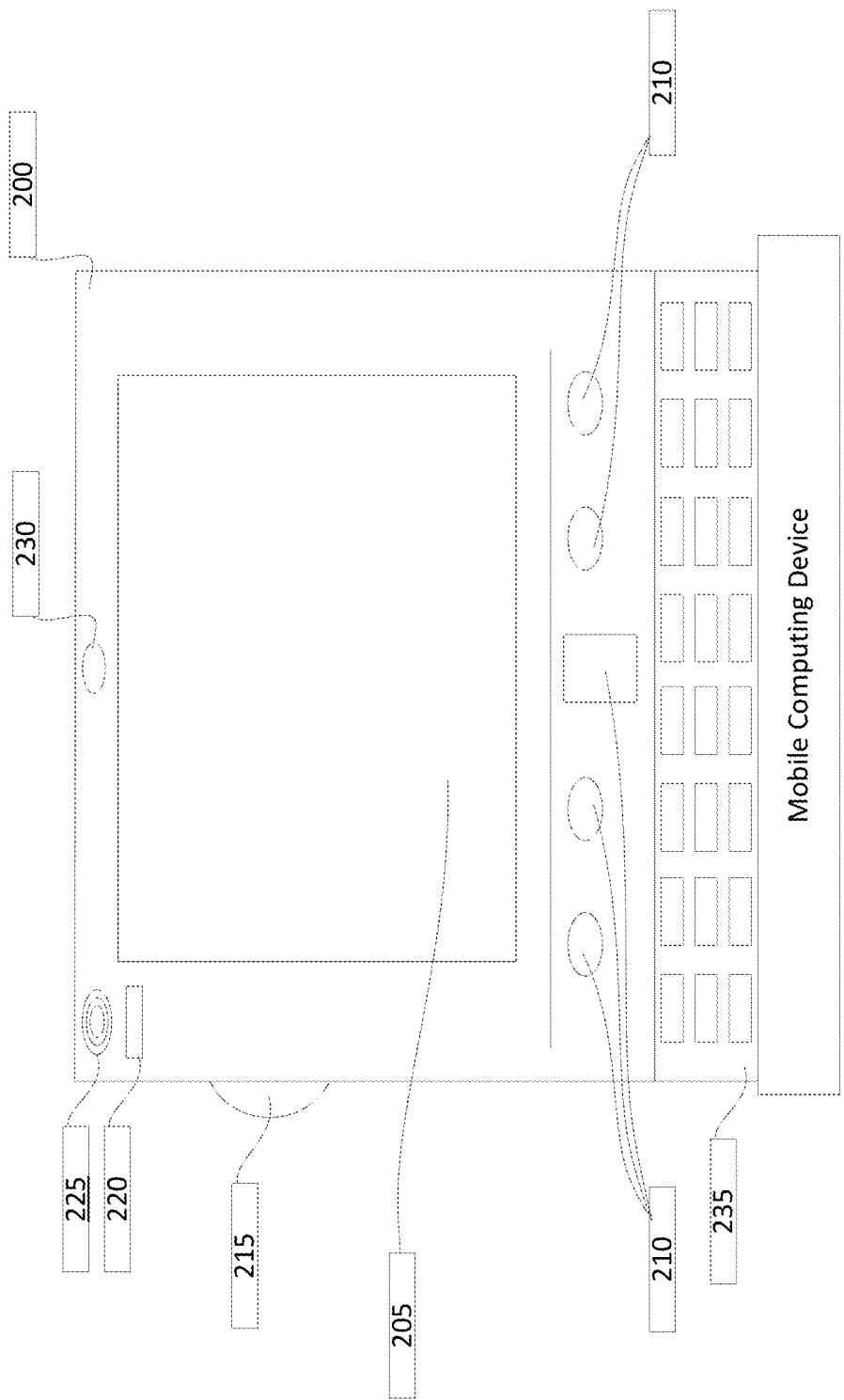
FIGS. 2A and 2B are simplified block diagrams of a mobile computing device with which aspects of the present disclosure may be practiced.
Figure 2B:
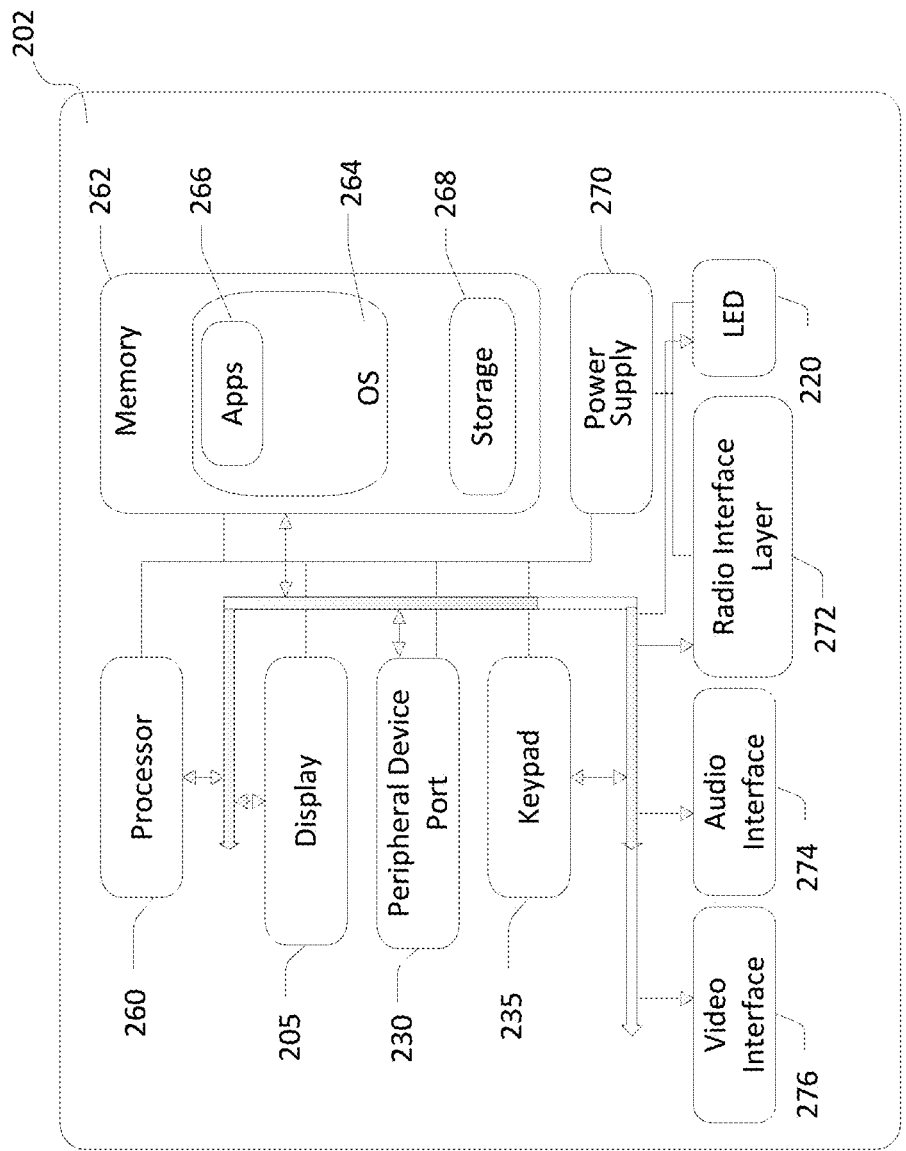
Figure 3:
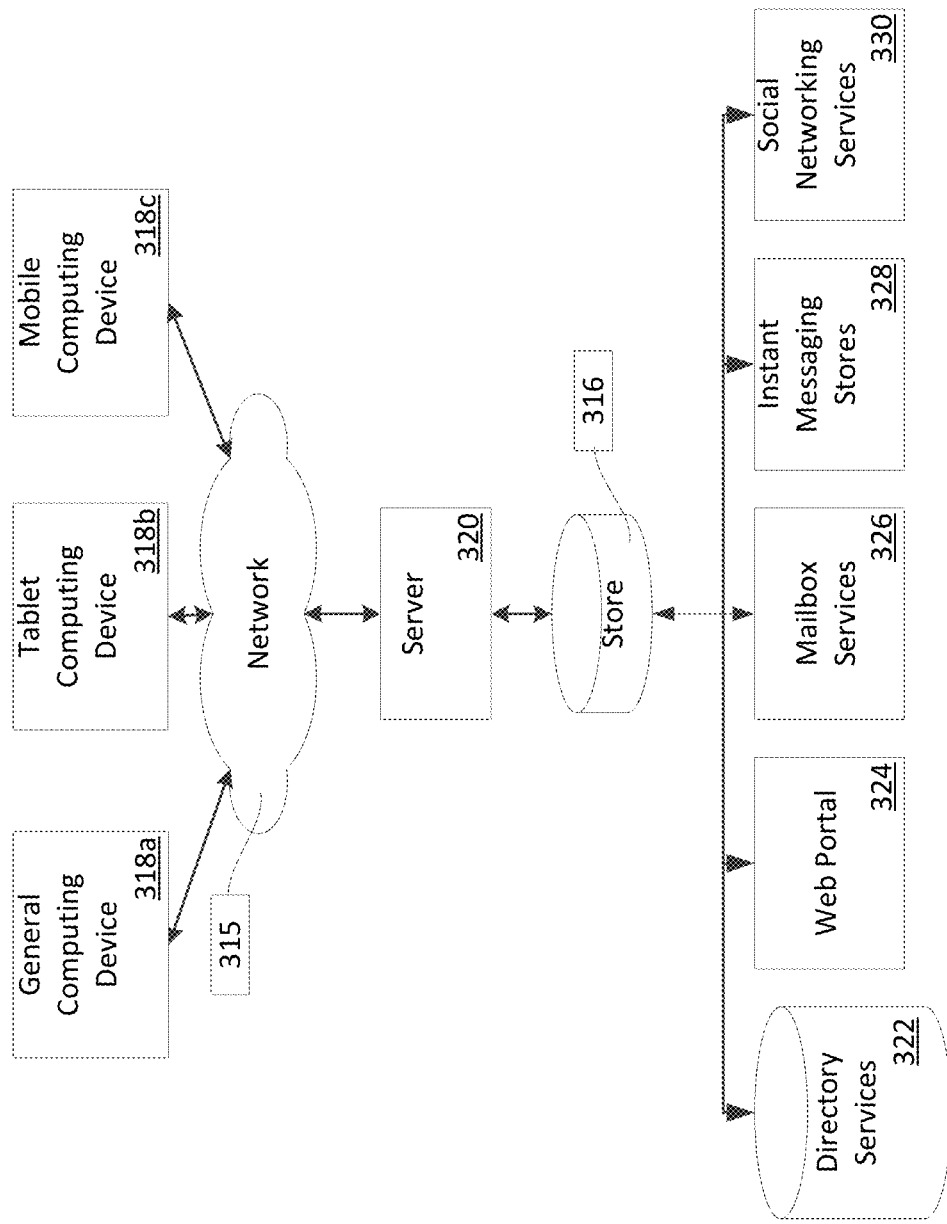
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. Among other examples, computing device 102 may be an exemplary computing device configured for execution of an exemplary presentation program as described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device configured for execution of an exemplary presentation program as described herein. Application command control may be provided for applications executing on a computing device such as mobile computing device 200. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, presentation programs and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device (e.g. system 202) described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225 (as described in the description of mobile computing device 200). In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225 (shown in FIG. 2A), the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system configured for execution of an exemplary presentation program as described herein. Target data accessed, interacted with, or edited in association with programming modules 108 and/or applications 120 and storage/memory (described in FIG. 1) may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and a client node may be implemented for connecting to network 315. Examples of a client node comprise but are not limited to: a computing device 102 embodied in a personal computer, a tablet computing device, and/or by a mobile computing device 200 (e.g., mobile processing device). As an example, a client node may connect to the network 315 using a wireless network connection (e.g. WiFi connection, Bluetooth, etc.). However, examples described herein may also extend to connecting to network 315 via a hardwire connection. Any of these examples of the client computing device 102 or 200 may obtain content from the store 316.

FIG. 4A is an exemplary method 400 related to creation of an exemplary section of slides, with which aspects of the present disclosure may be practiced. As an example, method 400 may be executed by an exemplary processing device and/or system such as those shown in FIGS. 1-3. In examples, method 400 may execute on a device comprising at least one processor configured to store and execute operations, programs or instructions. Operations performed in method 400 may correspond to operations executed by a system and/or service that execute computer programs, application programming interfaces (APIs), neural networks or machine-learning processing, among other examples. As an example, processing operations executed in method 400 may be performed by one or more hardware components. In another example, processing operations executed in method 400 may be performed by one or more software components. In some examples, processing operations described in method 400 may be executed by one or more applications/services associated with a web service that has access to a plurality of application/services, devices, knowledge resources, etc. For instance, an exemplary presentation program may be provided as a web-service (over a distributed network) that a user can access over a network such as the Internet. An exemplary presentation program may be executing on a processing device, for example, that executes method 400.

Method 400 begins at processing operation 402, where an exemplary presentation program is executed. As an example, a presentation program may be executed on a client processing device or a processing device associated with a distributed network (e.g. in examples where the presentation program is a web-service application). Examples of a presentation program have been provided previously. Operation 402 may comprise providing an exemplary slide deck that a user may be building for presentation.

An exemplary presentation program may be configured to provide assistant features for creation and management of an exemplary section of slides and an exemplary a table of contents slide within the presentation program, among other examples. At any point during execution (processing operation 402), the presentation program may be configured to offer user interface elements for assistance in creating a section and/or table of contents slide. As section creation and table of contents slides are new features in a presentation program, a user interface of the presentation program may be configured to highlight such functionality for users. For instance, an indication may be provided that creation of a section of slides (or a table contents slide) is an available feature, for example, through call-outs, highlighting, notifications, etc. Assistance for creation of a section and/or table of contents slide may further be provided through help features, videos, tutorials, etc. Before a table of contents feature can be used in presentation of a slide deck, sections should be created for the slide deck. If sections are not set, a picker popup dialog may appear and provide help creating sections. If no sections are present, an exemplary user interface of a presentation program may assist users with a pop-up dialog to help define the sections. This can help ensure that the experience for inserting a table of contents can be done in one step.

At processing operation 404, selection of one or more slides of a slide deck may be received through the presentation program. Select slides may be used to create an exemplary section of slides, for example, that can be accessed by a table of contents slide. Selection of slides may be made by a user and may occur in any manner including but not limited to: device input such as mouse selection or stylus, touch input and voice input, among other examples. In one example, a selection may be of one or more slides from a slide deck.

Flow may proceed to processing operation 406, where input is received for creation of a section of slides. As an example, a section of slides may be created for the one or more slides selected in processing operation 404. Processing Operation 406 may create a section, from selected slides, based on a selection of a user interface element (e.g. application command control) for the presentation program or alternatively voice input and/or touch input, among other examples. For instance, an "insert" user interface element for creating a section may be selected.

At processing operation 408, the presentation program may create a section from the one or more selected slides. As an example, the section may be created (processing operation 408) based on receiving the input requesting creation of a section. Creation (processing operation 408) of a section may comprise grouping the selected slides in a parent/child relationship for the section of slides. For instance, a first slide (of the selected slides) may be assigned as the parent slide of the section with other selected slides being child slides of the parent. One skilled in the art that understands the present disclosure should recognize that the presentation program may be configured to manipulate or modify section creation, for example, based on received user input. For instance, a user may modify an order of slides in a section to alter a parent/child relationship for a section of slides.

In some examples, the presentation program may be configured to create more than one section of slides. In one example, multiple sections may be created from selected slides based on input received from a user. In another example, the presentation program may be configured to create one section from the selected slides and create sections for any other slides that were not selected (e.g. non-selected slides may become their own section).

Flow may proceed to processing operation 410, where a representation of a created section may be displayed within the presentation program. For example, processing operation 410 may comprise displaying an updated slide deck that illustrates that the selected slides are grouped into a section. The presentation program may be configured to display (processing operation 410) the created section in an editing mode, where a user is able to edit slides/slide order of a slide deck. A user can choose to save or modify a slide deck. In one example, a user may select to view the slide deck in a presenter mode of the presentation program. The presenter mode may provide a presenter view of the slide deck, where the user has navigation control of the slide deck being presented in a slideshow presentation.

Flow may proceed to decision operation 412, where it is determined whether the presenter mode is entered. If the presenter mode is not entered, flow branches NO and processing of method 400 proceeds to decision operation 416 (described below). If input is received requesting entry of a presenter mode, flow branches YES and method 400 proceeds to operation 414.

At processing operation 414, the presentation program enters the presenter mode and presents the slide deck in a presenter view. As identified above, in the presenter view, a user has navigation control of the slide deck being presented in a slideshow presentation. Presentation (processing operation 414) of the slide deck in the presenter view may comprise any navigation operation related to viewing slides of the slide deck including completing the slide deck and exiting a presenter view.

Flow may proceed to decision operation 416, where it is determined whether an update occurs to one or more sections of a slide deck. If no update occurs, flow branches NO and processing of method 400 remains idle until subsequent processing is received. If an update to one or more sections of the slide deck occurs (including creation of a new section), flow returns to processing operation 406, where input is received for creation (or update) of a section. As identified above, the presentation program may present the slide deck in an editing mode. Update (associated with decision operation 416) to one or more sections of the slide deck may occur while the slide deck is being presented in the editing mode (e.g. after exiting a presentation view of the slide deck).

Figure 4B:
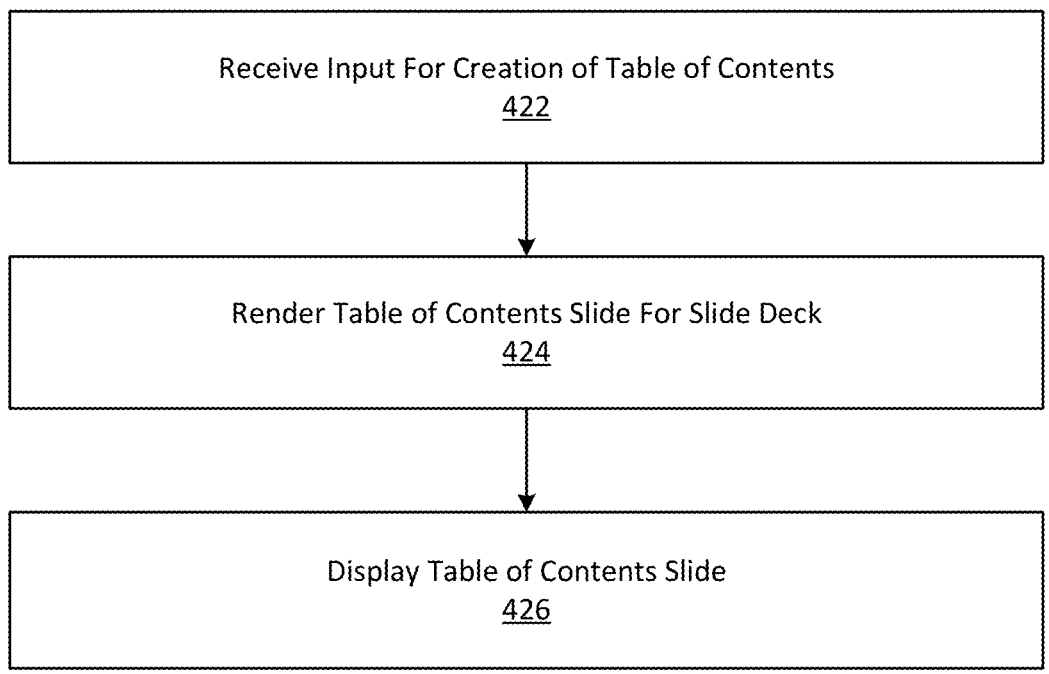
FIG. 4B is an exemplary method related to rendering of an exemplary table of contents in a presentation program, with which aspects of the present disclosure may be practiced.

FIG. 4B is an exemplary method 420 related to rendering of an exemplary table of contents in a presentation program, with which aspects of the present disclosure may be practiced. Visual depictions of a table of contents slide and/or an exemplary user interface for creation of a table of contents slide are illustrated in the processing device views shown in FIGS. 5A-5E. As an example, method 420 may be executed by an exemplary processing device and/or system such as those shown in FIGS. 1-3. In examples, method 420 may execute on a device comprising at least one processor configured to store and execute operations, programs or instructions. Operations performed in method 420 may correspond to operations executed by a system and/or service that execute computer programs, application programming interfaces (APIs), neural networks or machine-learning processing, among other examples. As an example, processing operations executed in method 420 may be performed by one or more hardware components. In another example, processing operations executed in method 420 may be performed by one or more software components. In some examples, processing operations described in method 420 may be executed by one or more applications/services associated with a web service that has access to a plurality of application/services, devices, knowledge resources, etc. For instance, an exemplary presentation program may be provided as a web-service (over a distributed network) that a user can access over a network such as the Internet. An exemplary presentation program may be executing on a processing device, for example, that executes method 420.

Method 420 begins at processing operation 422, where input is received, through a presentation program, for creation of a table of contents slide. A table of contents slide is a master slide that is usable to navigate to sections in an exemplary slide deck, which may be presented in a presentation view of the presentation program (or another type of productivity application). Input may comprise selection of an application command control for creation of a table of contents slide. As identified previously, an exemplary presentation program may provide user interface assistance for creation of a table of contents slide. As an example, input may be received (processing operation 422) while the presentation program is in an editing mode enabling a user to edit slides of a slide deck.

Flow may proceed to processing operation 424, where a table of contents slide is rendered for a slide deck. The table of contents may be utilized for organization of content of a slide deck into sections that can be navigated during presentation of the slide deck. In one example, if sections are not present in a slide deck, a user interface of the presentation program may direct a user to create sections for slides of the slide deck before the table of contents slide is rendered. Examples related to section creation have been previously described in the description of method 400. As an example, if sections have been created for a slide deck, input to create a table of contents slide may cause the presentation program to create a new slide for an exemplary table of contents slide.

Rendering (processing operation 424) of an exemplary table of contents slide may comprise creating one or more section links for sections of an exemplary slide deck. An exemplary section link (of a rendered table of contents slide) provides direct access from the table of contents slide to a section of slides (e.g. one or more grouped slides). The section link links the table of contents slide to a section of grouped slides. A section link creates a relationship between the table of contents slide and a section of slides. In one example, a section link may create a parent/child relationship between the table of contents slide (e.g. parent slide) and a section of slides, where a first slide of a section and any subsequent slides of the section may be considered child slides. As an example, a section link may link the table of contents slide to a first slide of a selected section of slides within the slide deck. For instance, during a presentation of a slide deck (e.g. a presentation view of the presentation program), a user may provide input selecting a section link of the table of contents slide. Selection of a section link may prompt the presentation program to directly navigate the slide deck to the selected section (e.g. even when the section is not a next ordered slide). In one instance, the presentation program (e.g. in the presenter view) may utilize a parent/child relationship between the table of contents slide and a section of slides to automatically navigate back to the table of contents slide when navigation of the section is completed.

As described above, an exemplary section link may be a slide preview of a section of slides. In one instance, the slide preview may be generated from a first slide of section. However, the slide preview may incorporate content from any slides of a section of slides. A slide preview may be a pictorial representation of a slide but may comprise additional types of content including but not limited to rich text format, audio content, video content, hyperlinks, etc. In other examples, a table of contents slide may provide a hyperlink to a section as well as a selectable slide preview, where either link can be selected to access a particular section of a slide deck when in a presenter view of the slide deck. A section link may be dynamically tied to the first slide of a created section. For instance, if the first slide is modified, the section link of the table of contents slide may be dynamically updated.

In one example, input requesting creation of a table of contents slide may automatically trigger creation of a section link/links for sections of a slide deck. Rendering (processing operation 424) of a table of contents slide may comprise:

detecting one or more sections of grouped slides of the slide deck, generating a section link for each of the one or more sections and inserting the section link within the table of contents slide. In an alternative example, creation of a table of contents slide may guide users to create sections for slides of a slide deck (e.g. refer to at least FIGS. 5B-5C and the accompanying description).

Once a table of contents slide is rendered, flow may proceed to processing operation 426, where the table of contents slide is displayed in the presentation program. A user, through a user interface of the presentation program, may modify the table of contents slide or re-position the table of contents slide within the slide deck, among other examples.

Figure 4C:
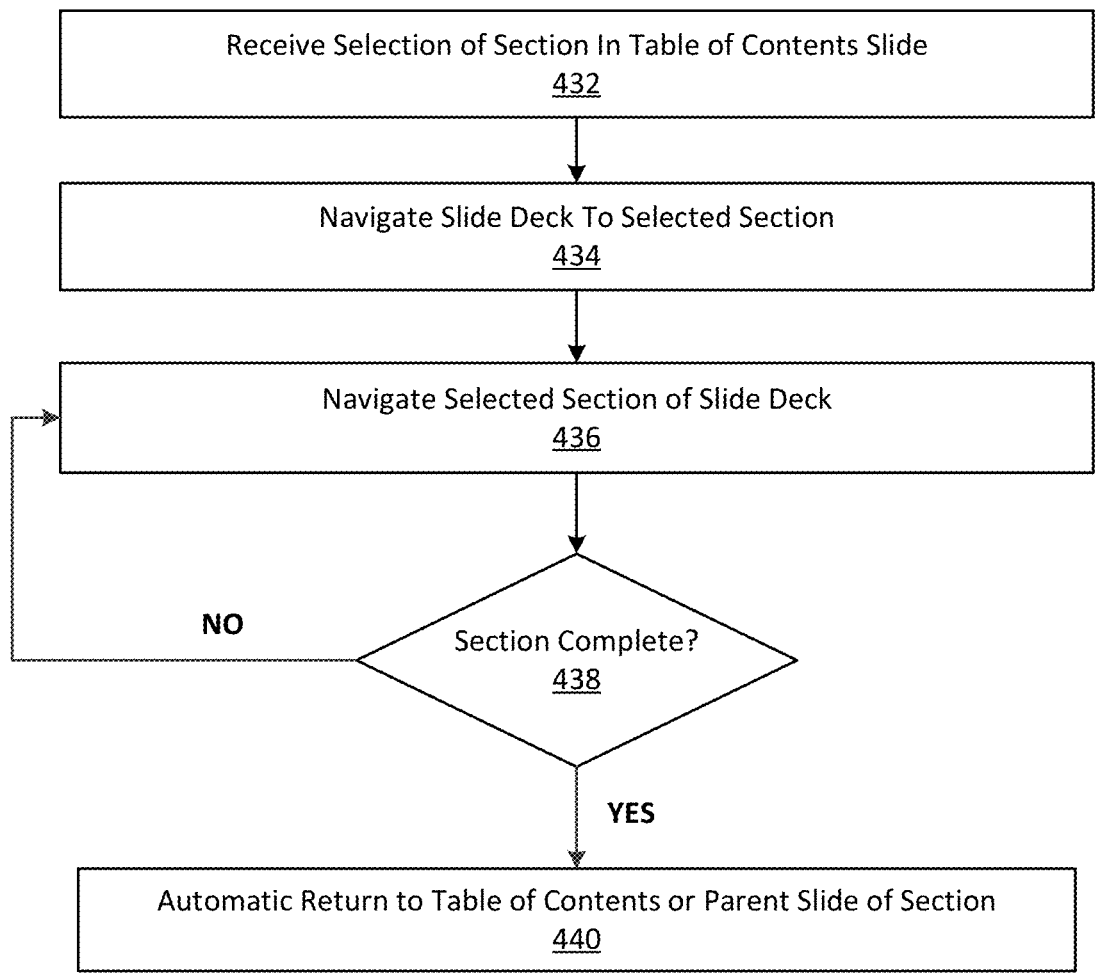
FIG. 4C is an exemplary method related to display of an exemplary table of content in a presentation program, with which aspects of the present disclosure may be practiced.
Figure 5B:
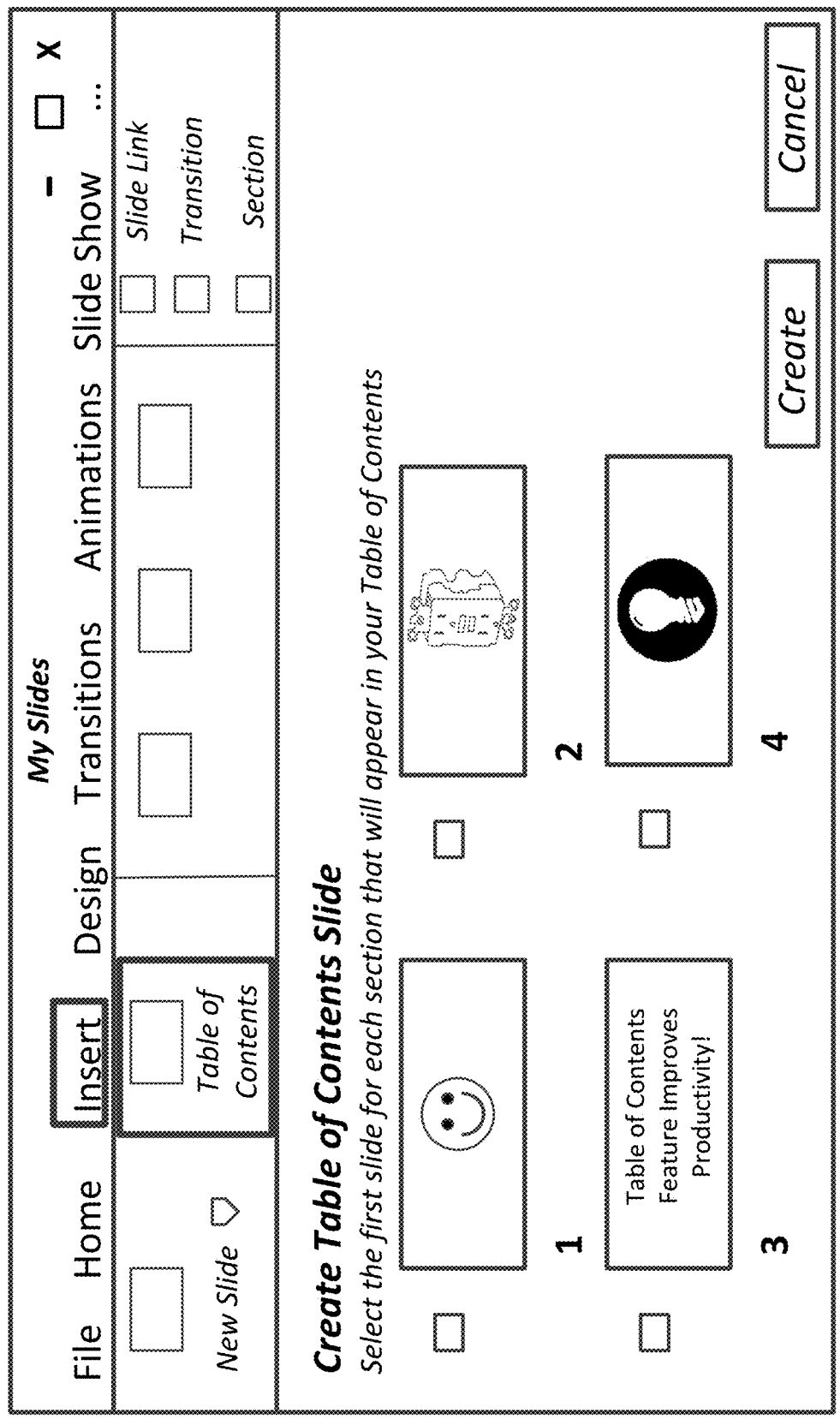
Figure 5C:
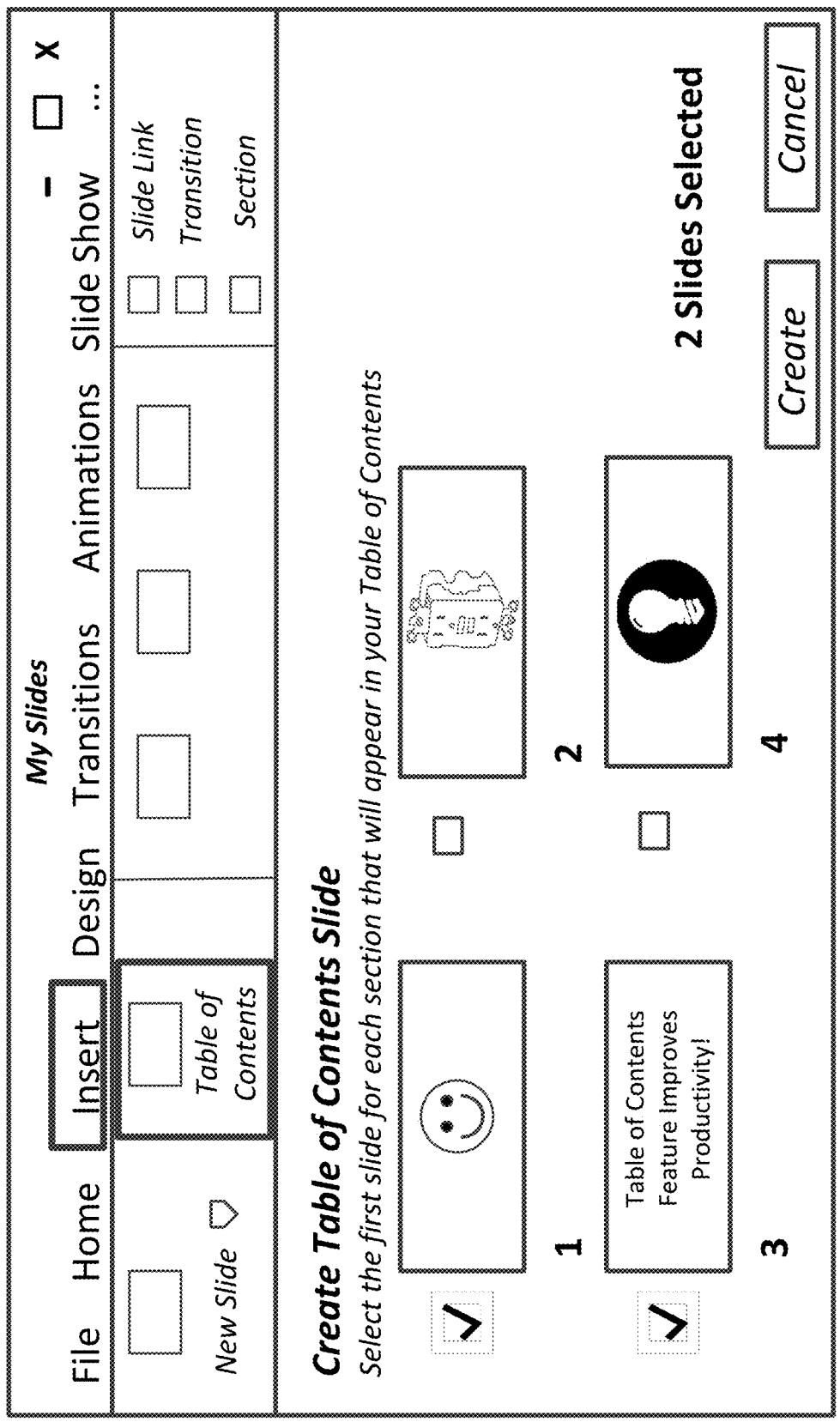
Figure 5D:
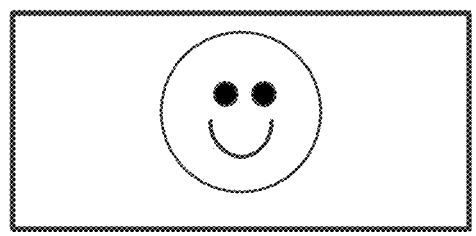
Figure 5D:
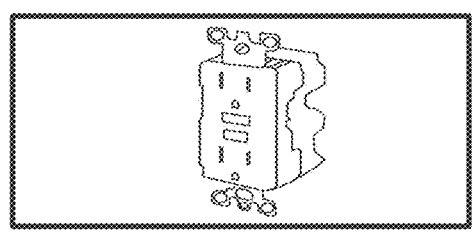
Figure 5D:
Figure 5D:
Figure 5E:
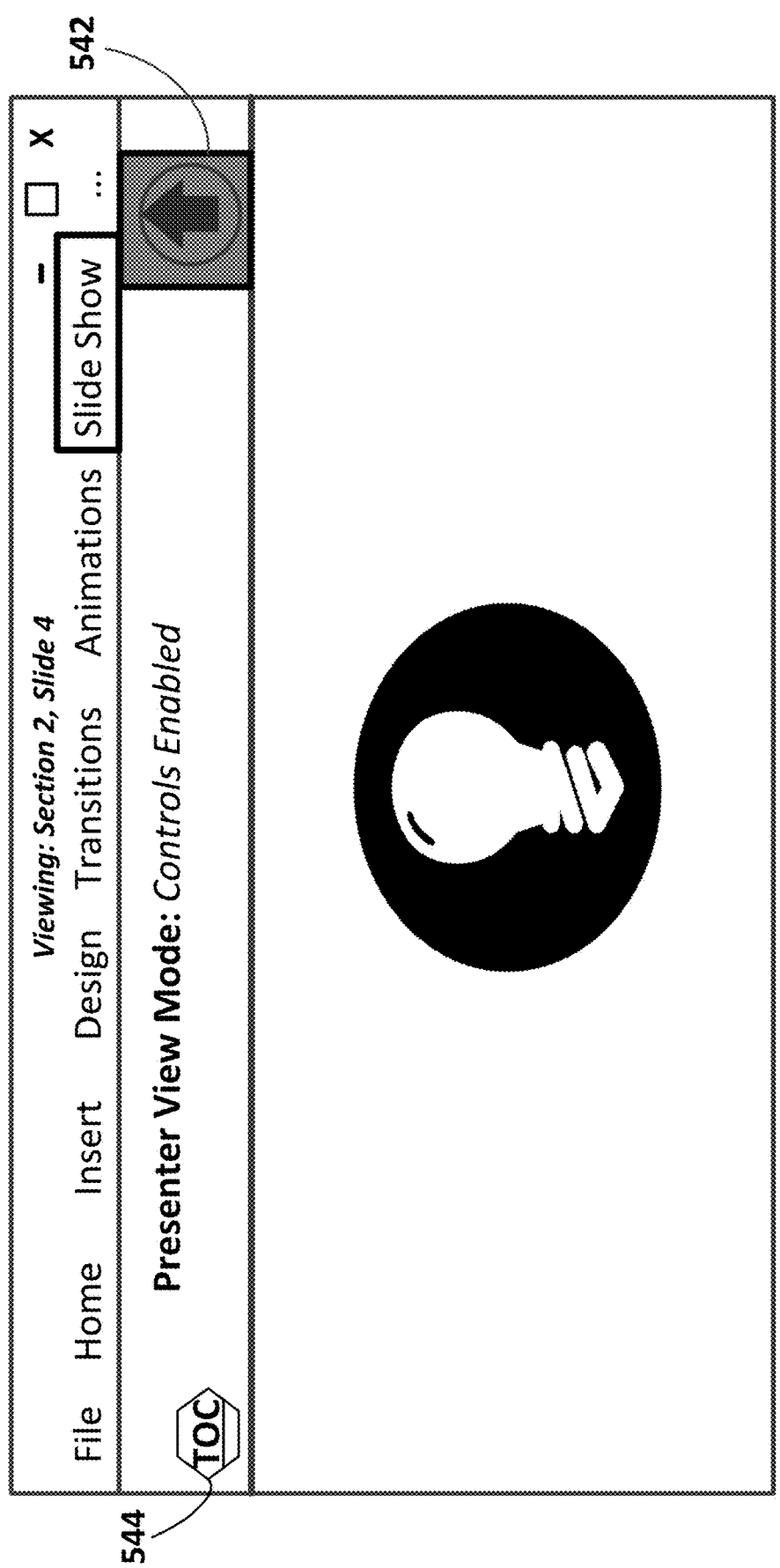

FIG. 4C is an exemplary method 430 related to display of an exemplary table of content in a presentation program, with which aspects of the present disclosure may be practiced. As an example, method 430 may be executed by an exemplary processing device and/or system such as those shown in FIGS. 1-3. In examples, method 430 may execute on a device comprising at least one processor configured to store and execute operations, programs or instructions. Operations performed in method 430 may correspond to operations executed by a system and/or service that execute computer programs, application programming interfaces (APIs), neural networks or machine-learning processing, among other examples. As an example, processing operations executed in method 430 may be performed by one or more hardware components. In another example, processing operations executed in method 430 may be performed by one or more software components. In some examples, processing operations described in method 430 may be executed by one or more applications/services associated with a web service that has access to a plurality of application/services, devices, knowledge resources, etc. For instance, an exemplary presentation program may be provided as a web-service (over a distributed network) that a user can access over a network such as the Internet. An exemplary presentation program may be executing on a processing device, for example, that executes method 430.

Method 430 begins at processing operation 432, where a selection is received selecting a section in an exemplary table of contents slide. A computing device may be executing the presentation program enabling a user to make a selection of a section in a table of contents slide within the presentation program. In one example, the selection of the table of contents slide may occur in a presenter view of an exemplary slide deck in which the table of contents slides is included. The presenter view may present the slide deck in a full screen slideshow display. Selection of a section may be received through selection of an exemplary section link provided within a table of contents slide. The table of contents slide may comprise one or more sections of grouped slides for the slide deck that are selectable via section links. An exemplary presentation program may receive (processing operation 432) the selection for processing.

Flow may proceed to operation 434, where an exemplary presentation program may navigate the slide deck to a first slide of the section based on the selection in processing operation 432. In navigating (processing operation 434) to a first slide of a section, an exemplary presentation program is configured to provide custom viewing experience that immerses the user into a selected section. As described above, creation of a section link creates a parent/child relationship between a table of contents slide and a section of slides, where selection of a section link can trigger the presentation program to navigate from the table of contents slide to a first slide of a linked section. In doing so, the presentation program may be configured to execute a contextual zoom transition between a table of contents slide and slides of selected sections. A contextual zoom provides a view of content for the slide that is next to be viewed in a manner that relates to the slide that is currently being viewed. Contextual zoom transitions may comprise zoom-in transitions and zoom-out transitions.

In one example, a contextual zoom transition may be a dynamic transition to account for manipulation of an exemplary section link. For instance, a zoom-in transition may be generated for a transition between the table of contents slide and a first slide of the section. The zoom-in transition may account for features of the section link including: a placement, a scale and an orientation of the section link in the table of contents slide. As an example, a section link may be located in an upper left corner of the table of contents slide, scaled to be larger than other content of the slide and oriented at an angle where the text of the section link is rotated to be in a vertical alignment. In that example, a zoom-in transition may initiate a zoom from the perspective of the selected section link where the transition: is initiated from the left side of the table of contents slide, enlarges the text of the section link and rotates a canvas displaying the slide from an orientation of the text of the section link to an orientation that matches the content of the first slide of the section. This is just one of many possible examples that illustrates how a zoom transition for a section link is more dynamic than that of a standard zoom transition between slides. Standard zoom transitions typically only allow zooming from a center of a slide inward, where timing is the only adjustable parameter for standard transitions. Improved zoom transition functionality can be applied to any slide transition scenario including zoom-out transitions (e.g. from a section to a table of contents slide) and/or transitions between slides of a section, among other examples.

To create a contextual zoom transition, the presentation program may create and utilize a data object for slide transitions. In doing so, the presentation program may utilize the data object to manage parameters associated with different slides to create a transition between slides. An exemplary data object may hold parameters related to slide transitions. Examples of parameters for slide transitions comprise but are not limited to: identification of slides to transition to (or transition from), parameters for layout of a slide, parameters for content of a slide, slide linking markers indicating sections, parent/child relationships between sections of slides and/or relationships between a section link, dependency, etc., parameters for removing a background of a slide (e.g. for transition), parameters for adopting a background of a slide (e.g. for transition), parameters for inserting user interface elements for navigational control within a slide, parameters for features (e.g. placement, scale, orientation, etc.) associated with a created link such as a section link and an indication as to whether to return to a previous slide or table of contents slide, among other examples.

Moreover, the presentation program may further comprise navigating (processing operation 436) between slides of the section. For instance, selection of an exemplary section link may cause the presentation program to present a complete section for viewing in a presenter view. That is, selection of a section link may cause the presentation program to navigate, from the table of contents slide, to a first slide of the section, even in a situation where the section is out of an original order for slides of a slide deck. The presentation program may further navigate (processing operation 436)

between linked slides of the section (e.g. child slides of the first slide). During navigation (processing operation 436), the presentation program may render a zoom-in transition, for example, from the first slide of the section to a second slide of the section based on an input navigating to the second slide. Such an instance presents another example of a contextual zoom transition, where the presentation program may seamlessly move to another slide so a user does not feel like the presentation program is moving to another slide. In that example, a zoom transition may adopt a background of a parent slide of a section and maintain that background as navigation proceeds through slides of the section.

Flow may proceed to decision operation 438, where it is determined whether navigation of the section is complete. If not, flow branches NO and returns back to processing operation 436, where navigation of a selected section of a slide deck continues. If navigation of a section is complete, flow branches YES and proceeds to processing operation 440.

At processing operation 440, the presentation program returns the slide deck back to the table of contents slide when the navigation of the section is completed. In examples the presentation program may be configured to automatically return (processing operation 440) the slide deck back to the table of contents slide from the end of a linked section. As an example, the presentation program may utilize an exemplary data object (or data objects) for slide transition to identify a relationship between the table of contents slide and a section of slides and direct navigation of a slide deck accordingly.

In alternative examples, a user may disable an automatic return to the table of contents slide. For instance, the presentation program may enable users to customize a slide order for a presentation. In another example, the disabling of the automatic return feature may result in navigation to a next slide (of an ordered slide deck). In one example, the presentation program may be configured to present a user interface element that a user can select to return to the table of contents slide during a presentation. An example of a user interface element to return to the table of contents slide is shown in user interface view 540 (and described in the description of FIG. 5E). In one instance, a table of contents feature for return to a table of contents slide may appear after a user reaches the last slide of a section or when a user interacts with a processing device (e.g. touches a display or moves a mouse, among other examples).

In yet another alternative example, a presentation program may be configured to return (processing operation 440) navigation of a slide deck back to a first slide of a section after completion of a last slide of the section. For instance, the presentation program may automatically navigate the slide deck to a parent slide of a section based on completion of navigation of the section. In a case where navigation is automatically returned (processing operation 440) to a first slide of a section, a user may have manual control to navigate the slide deck back to the table of contents slide (e.g. by selecting a back button or return to previous slide feature provided as a control for slide deck navigation during a presenter view). In one example, the presentation program may be configured to present a user interface element that a user can select to return to the table of contents slide during a presentation. In alternative examples, the presentation program may be configured to display (on a slide) a user interface element to return to the table of contents slide is shown in user interface view 540 (and described in the description of FIG. 5E). In one instance, a table of contents feature for return to a table of contents slide may appear after navigation is automatically returned to a first slide or when a user interacts with a processing device (e.g. touches a display or moves a mouse, among other examples) after navigation returns (processing operation 440) to the first slide of the section.

In other alternative examples, the presentation program may be configured to allow a user to designate a slide for a return (processing operation 440). While a presentation program may be initially configured to automatically return a slide deck to a particular slide (e.g. table of contents slide or first slide of a section), the presentation program may comprise user interface features that enable a user to customize presentation of a slide deck.

In at least one example, processing operation 440 may comprise rendering a zoom-out transition from a last slide of the section back to the table of contents slide (or alternative destination slide). In doing so, the presentation program may utilize the exemplary data objects for slide transitions (as described above). The zoom-out transition may account for a placement, a scale and an orientation of a section link, for example, in the table of contents slide.

Returning (processing operation 440) the slide deck to a table of contents slide provides a user with added navigational control of the slide deck by enabling a presenter to easily manipulate an order of presented slides as well as provide built in section breaks, among other examples. For instance, a viewer of a presentation may have a question pertaining to a slide of a previous section. Instead of a user having to navigate through all of the slides in a slide deck to find that previous slide, a user can utilize the table of contents slide (and navigational improvements) to more efficiently access a previous slide (or section of slides).

FIGS. 5A-5E provide exemplary user interface views for an exemplary presentation program, with which aspects of the present disclosure may be practiced. User interface views shown in FIGS. 5A-5E are examples of added user interface functionality related to the creation and management of an exemplary table of contents slide. One skilled in the art that understands the present disclosure should recognize that presentation of user interface elements described herein may vary while maintaining the spirit of the present disclosure.

User interface view 500 (of FIG. 5A) illustrates a modification to a ribbon for application command control for an exemplary presentation program. As shown in user interface view 500, a user may select an "insert" option, for example, to insert content within a slide deck of a presentation program. User interface features associated with the "insert" option are modified to include a table of contents feature 504. The table of contents feature 504 enables a user to utilize the presentation program to insert an exemplary table of contents slide.

User interface view 510 (of FIG. 5B) illustrates a selection of the table of contents feature 504. As shown in processing device view 510, a user is guided to create a table of contents slide. For instance, a user may select specific existing slides that are used to create sections. An exemplary presentation program can create exemplary section links for one or more selected slides. In alternative examples (as described in the foregoing), sections may already be created for a slide deck. In such a case, a presentation program may detect the created sections and automatically render a table of contents slide with section links (as shown in user interface view 530 of FIG. 5D).

In examples where a user is selecting slides to create sections, user interface view 520 (of FIG. 5C) illustrates selection of specific slides for automated section creation. As seen in user interface view 520, slides "1" and "3" are selected for section creation. A result may be that a first section is created (for slides 1 and 2) and a second section is created (for slides 3 and 4). The user interface of the presentation program may further highlight the number of slides selected for the user (e.g. 2 slides selected) through visual cues or audio cues, among other examples.

User interface view 530 (of FIG. 5D) illustrates an exemplary table of contents slide that is rendered to include exemplary section links for the selected sections of the slide deck. As illustrated in processing device view 530, a first section link 532 is created (for slides 1 and 2) and a second section link 534 is created (for slides 3 and 4). An exemplary section link may comprise identification of a created section. In one example, an exemplary section link may comprise a title for a section (see second section link 534). The title may be set by the user or automatically generated from content (e.g. textual title) of a first slide of a section, among other examples. When the table of contents slide is presented in a presenter view, a user may select the section link or an individual slide shown within a linked section to navigate to a particular slide of the slide deck. When a user is editing a slide deck, section links (and slide links) may also be active to enable a user to quickly navigate to a particular slide.

In alternative examples, section links within a table of contents slide may be collapsible. For instance, a table of contents slide may display only section links for slides of a slide deck without showing slides of a particular section. In yet another alternative example, selection of a user interface feature (e.g. arrow next to a section link) may present a user with options related to modification of a view for a section link. Users may have control over selecting a view for section links of table of contents slides. In other cases, an exemplary presentation program may have automatic settings for viewing of a section link. For instance, a user may select a particular section link and upon completion of a viewing of a particular slide, navigation back to the table of contents slide may result in a section link being collapsed (indicating that the section has been viewed). A user may have control to customize view settings for a table of contents slide and/or section links including automatic navigation features relating to a presenter view of a slide deck.

User interface view 540 (of FIG. 5E) illustrates an exemplary child slide of a section. For instance, the child slide is a second slide of a second created section (as shown in processing device view 530 of FIG. 5D). In some examples, a user interface of a presentation program may be configured to provide user interface elements to assist with navigational control when a slide deck is being presented in a presenter view. For instance, an exemplary section may comprise a plurality of slides. An exemplary presentation program may maintain slide linking markers to assist with management of navigation and transition between slides during a presentation of the slide deck. Slide linking markers may be parameters of an exemplary data object for slide transitions, that the presentation program can use to efficiently control navigation between slides. Slide linking markers may be used in association with user interface features such as the just-in-time navigation feature 542 and the table of contents shortcut feature 544, described below.

During presentations, slides that are child slides may comprise a just-in-time navigation feature 542 that enables navigation back to a parent slide of a section. While the just-in-time navigation feature 542 is shown at the right-side of a displayed screen, a position of the just-in-time navigation feature 542 may vary based on developer specifications. The just-in-time navigation feature 542 may be selectively displayed whenever a child slide is displayed within a section, among other examples. In some examples, the just-in-time navigation feature 542 may be selectively displayed, where the just-in-time navigation feature 542 is hidden until the user moves the mouse and/or taps on the screen. In such an example, when the on screen user interface controls disappear, the just-in-time navigation feature 542 may disappear as well.

Furthermore, a user may desire to quickly navigate back to a table of contents slide. A table of contents shortcut feature 544 may be provided by an exemplary presentation program to enable quick navigation back to a table of contents slide. In examples where the child slide is the last slide of a section, the presentation program may automatically navigate the slide deck back to the table of contents slide (shown in processing device view 530 of FIG. 5D). In such an examples, the table of contents shortcut feature 544 may be hidden from display (as the slide deck is configured to be automatically navigated back to the table of contents slide).

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A device implemented method comprising:
receiving, in an editing mode of a presentation program, input requesting creation of a table of contents slide for a slide deck of the presentation program;
in response to receiving the input, enabling presentation of representations of slides of the slide deck;
receiving, in the editing mode, a selection of a subset of the representations;
subsequent to receiving the selection of the subset of the representations, generating the table of contents slide by inserting an additional slide in the slide deck, wherein the table of contents slide comprises:
the additional slide of the slide deck;
multiple section headers corresponding to multiple sections of the slide deck, wherein each of the multiple sections includes one or more slides of the slide deck and wherein each of the multiple section headers comprises a hyperlink that links to a first one of the one or more slides in a corresponding section; and
one or more previews of the one or more slides in each of the multiple sections based at least on the selection of the subset of representations, wherein each of the one or more previews comprises a link to a slide in the slide deck; and in response to receiving a selection of one of the multiple section headers or the one or more previews, navigating the slide deck to a corresponding slide in the slide deck.

2. The device implemented method of claim 1, further comprising:

automatically creating a section in the slide deck based at least on the selection of the subset of the representations.

3. The device implemented method of claim 1, further comprising rendering, in the presentation program, the table of contents slide for the slide deck.

4. The device implemented method of claim 3, wherein the rendering further comprises creating the multiple section headers and the one or more previews of the one or more slides, wherein the creating of the multiple section headers and the one or more previews of the one or more slides comprises:

detecting a section of the multiple sections, generating, for the section, a corresponding section header of the multiple section headers and a corresponding preview of the one or more previews of the one or more slides, wherein the corresponding section header and the corresponding preview link the table of contents slide to the corresponding slide, and inserting the corresponding section header and the corresponding preview link within the table of contents slide.

5. The device implemented method of claim 1, further comprising, inserting a table of contents link into at least one of the one or more slides of the one or more sections, wherein selecting the table of contents link causes the slide deck to return to the table of contents slide.

6. The device implemented method of claim 1, wherein the navigating further comprises rendering a zoom-in transition from the table of contents slide to the corresponding slide, and wherein the zoom-in transition accounts for a placement, a scale, and an orientation of at least one of the multiple section headers in the table of contents slide when transitioning to the corresponding slide.

7. The device implemented method of claim 1, wherein the navigating further comprises rendering a zoom-in transition from the corresponding slide to a second slide in the slide deck based on an input navigating to the second slide, and wherein the zoom-in transition maintains a background of the corresponding slide and displays content of the second slide when transitioning to the second slide.

8. The device implemented method of claim 5, further comprising, in response to selecting the table of contents link, rendering a zoom-out transition to the table of contents slide, wherein the zoom-out transition accounts for a placement, a scale, and an orientation of at least one of the multiple section headers in the table of contents slide when transitioning to the table of contents slide.

9. A system comprising:

at least one processor; and a memory operatively connected with the at least one processor storing computer-executable instructions that, when executed by the at least one processor, causes the at least one processor to execute a method that comprises:

receiving, in an editing mode of a presentation program, input requesting creation of a table of contents slide for the presentation program;

in response to receiving the input, enabling presentation of representations of slides of a slide deck;

receiving, in the editing mode, a selection of a subset of the representations;

subsequent to receiving the selection of the subset of the representations, generating the table of contents slide by inserting an additional slide in the slide deck, wherein the table of contents slide comprises:

the additional slide of the slide deck;

multiple section headers corresponding to multiple sections of the slide deck, wherein each of the multiple sections includes one or more slides of the slide deck and wherein each of the multiple section headers comprises a hyperlink that links to a first one of the one or more slides in a corresponding section; and one or more previews of the one or more slides in each of the multiple sections based at least on the selection of the subset of the representations, wherein each of the one or more previews comprises a link to a slide in the slide deck; and in response to receiving a selection of one of the multiple section headers or the one or more previews, navigating the slide deck to a corresponding slide in the slide deck.

10. The system of claim 9, wherein the method, executed by the at least one processor, further comprises automatically creating a section in the slide deck based at least on the selection of the subset of the representations.

11. The system of claim 9, wherein the method, executed by the at least one processor, further comprises rendering, in the presentation program, the table of contents slide for the slide deck.

12. The system of claim 11, wherein the rendering further comprises creating the multiple section headers and the one or more previews of the one or more slides, wherein the creating of the multiple section headers and the one or more previews of the one or more slides comprises:

detecting a section of the multiple sections, generating, for the section, a corresponding section header of the multiple section headers and a corresponding preview of the one or more previews of the one or more slides, wherein the corresponding section header and the corresponding preview link the table of contents slide to the corresponding slide, and inserting the corresponding section header and the corresponding preview link within the table of contents slide.

13. The system of claim 9, wherein the method, executed by the at least one processor, further comprises inserting a table of contents link into at least one of the one or more slides of the one or more sections, wherein selecting the table of contents link causes the slide deck to return to the table of contents slide.

14. The system of claim 9, wherein the navigating further comprises rendering a zoom-in transition from the table of contents slide to the corresponding slide, and wherein the zoom-in transition accounts for a placement, a scale, and an orientation of at least one of the multiple section headers in the table of contents slide when transitioning to the corresponding slide.

15. The system of claim 9, wherein the navigating further comprises rendering a zoom-in transition from the corresponding slide to a second slide in the slide deck based on an input navigating to the second slide, and wherein the zoom-in transition maintains the background of the corresponding slide and displays content of the second slide when transitioning to the second slide.

16. The system of claim 13, further comprising, in response to selecting the of the table of contents link, rendering a zoom-out transition to the table of contents slide, wherein the zoom-out transition accounts for a placement, a scale, and an orientation of at least one of the multiple section headers in the table of contents slide when transitioning to the table of contents slide.

17. A non-transitory computer-readable medium storing computer-executable instructions that, when executed by a computing device, causes the computing device to execute a method comprising:
  receiving, in an editing mode of a presentation program, input requesting creating of a table of contents slide for a slide deck of the presentation program;
  in response to receiving the input, enabling presentation of representations of slides of the slide deck;
  receiving, in the editing mode, a selection of a subset of the representations;
  subsequent to receiving the selection of the subset of the representations, generating the table of contents slide by inserting an additional slide in the slide deck, wherein the table of contents slide comprises:
  the additional slide of the slide deck;
  multiple section headers corresponding to multiple sections of the slide deck, wherein each of the multiple sections includes one or more slides of the slide deck and wherein each of the multiple section headers comprises a hyperlink that links to a first one of the one or more slides in a corresponding section; and
  one or more previews of the one or more slides in each of the multiple sections based at least on the selection of the subset of the representations, wherein each of the one or more previews comprises a link to a slide in the slide deck; and
  in response to receiving a selection of one of the multiple section headers or the one or more previews, navigating the slide deck to a corresponding slide in the slide deck.

18. The non-transitory computer-readable medium of claim 17, wherein the method further comprising
  automatically creating a section in the slide deck based at least on the selection of the subset of the representations.

19. The non-transitory computer-readable medium of claim 17, wherein the navigating further comprises rendering a zoom-in transition from the table of contents slide to the corresponding slide, and wherein the zoom-in transition accounts for a placement, a scale, and an orientation of at least one of the multiple section headers in the table of contents slide when transitioning to the corresponding slide.

20. The non-transitory computer-readable medium of claim 17, further comprising, in response to a selection of a table of contents link, rendering a zoom-out transition to the table of contents slide, wherein the zoom-out transition accounts for a placement, a scale, and an orientation of at least one of the multiple section headers in the table of contents slide when transitioning to the table of contents slide.

* * * * *